United States Patent
Karaki et al.

(10) Patent No.: US 12,068,864 B2
(45) Date of Patent: *Aug. 20, 2024

(54) HARQ-ACK REPORTING WITH PDSCH GROUPING

(71) Applicant: Telefonaktiebolaget LM Ericsson (publ), Stockholm (SE)

(72) Inventors: Reem Karaki, Aachen (DE); Johan Rune, Lidingö (SE); Yuhang Liu, Lund (SE); Sorour Falahati, Stockholm (SE); Havish Koorapaty, Saratoga, CA (US); Jung-Fu Cheng, Fremont, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/751,248

(22) Filed: May 23, 2022

(65) Prior Publication Data

US 2022/0360375 A1 Nov. 10, 2022

Related U.S. Application Data

(63) Continuation of application No. 16/393,516, filed on Apr. 24, 2019, now Pat. No. 11,349,614.

(51) Int. Cl.
*H04W 72/23* (2023.01)
*H04L 1/1812* (2023.01)
(Continued)

(52) U.S. Cl.
CPC .......... *H04L 1/1861* (2013.01); *H04L 1/1812* (2013.01); *H04L 1/1854* (2013.01); *H04W 72/23* (2023.01); *H04W 76/27* (2018.02)

(58) Field of Classification Search
CPC .... H04W 72/23; H04W 76/27; H04L 1/1812; H04L 1/1854; H04L 1/1867
(Continued)

(56) References Cited

U.S. PATENT DOCUMENTS

2016/0309461 A1  10/2016  Yin et al.
2017/0013390 A1  1/2017  You et al.
(Continued)

FOREIGN PATENT DOCUMENTS

KR  20180091019 A  8/2018
WO  2011044170 A1  4/2011
(Continued)

OTHER PUBLICATIONS

Intel Corporation, "R1-1904287: Enhancements to HARQ for NR-unlicensed," 3GPP TSG RAN WG1 Meeting #96bis, Apr. 8-12, 2019, Xi'an, China, 12 pages.
(Continued)

*Primary Examiner* — Dang T Ton
(74) *Attorney, Agent, or Firm* — Withrow & Terranova, PLLC

(57) ABSTRACT

A wireless device receives downlink control information (DCI) from a network node, determines a physical downlink shared channel (PDSCH) group based on information in the received DCI, and transmits a hybrid automatic repeat request acknowledgement (HARQ-ACK) report to the network node based on the determined PDSCH group.

23 Claims, 13 Drawing Sheets

REPLACEMENT DRAWING

(51) Int. Cl.
*H04L 1/1829* (2023.01)
*H04W 76/27* (2018.01)

(58) Field of Classification Search
USPC .................................. 370/395, 400, 403, 329
See application file for complete search history.

(56) References Cited

U.S. PATENT DOCUMENTS

| | | | |
|---|---|---|---|
| 2017/0215172 | A1 | 7/2017 | Yang et al. |
| 2018/0042015 | A1 | 2/2018 | Yin et al. |
| 2018/0139030 | A1 | 5/2018 | Kim et al. |
| 2019/0289598 | A1 | 9/2019 | Shimezawa |
| 2020/0100276 | A1 | 3/2020 | Oh et al. |
| 2020/0106569 | A1 | 4/2020 | Tsai et al. |
| 2022/0417976 | A1* | 12/2022 | Park .................. H04L 5/0078 |

FOREIGN PATENT DOCUMENTS

| | | |
|---|---|---|
| WO | 2014185850 A1 | 11/2014 |
| WO | 2018166447 A1 | 9/2018 |
| WO | 2019066630 A1 | 4/2019 |
| WO | 2020205728 A1 | 10/2020 |

OTHER PUBLICATIONS

Nokia, et al., "R1-1904828: On UCI Enhancements for NR URLLC," 3GPP TSG RAN WG1 #96bis, Apr. 8-12, 2019, Xi'an, China, 11 pages.

OPPO, "R1-1905716: Summary on UCI enhancements for URLLC," 3GPP TSG RAN WG1 #96bis, Apr. 8-12, 2019, Xi'an, China, 10 pages.

Qualcomm Incorporated, "R1-1905001: Enhancements to Scheduling and HARQ operation for NR-U," 3GPP TSG RAN WG1 Meeting #96b, Apr. 8-12, 2019, Xi'an, China, 13 pages.

Notice of Reasons for Rejection for Japanese Patent Application No. 2021-562807, mailed Dec. 20, 2022, 8 pages.

Office Action for Russian Patent Application No. 2021134072, mailed Jun. 25, 2022, 14 pages.

Cablelabs, "R1-150269: LBT with Exponential Backoff Process for Fair Channel Access," 3GPP TSG-RAN WG1 Meeting #80, Feb. 9-13, 2015, Athens, Greece, 3 pages.

Huawei, "R1-1905649: Feature lead summary of HARQ enhancements for NR-U," 3GPP TSG RAN WG1 Meeting #96bis, Apr. 8-12, 2019, Xi'an, China, 29 pages.

Intel Corporation, "R1-150089: LBT design for LAA downlink," 3GPP TSG TAN WG1 Meeting #80, Feb. 9-13, 2015, Athens, Greece, 9 pages.

Interdigital Inc., "R2-1804825: Scheduling enhancments for NR-based access to unlicensed spectrum," 3GPP TSG-RAN WG2 Meeting #101bis, Apr. 16-20, 2018, Sanya, China, 3 pages.

Lin, T-Y., et al., "EARC: Enhanced Adaptation of Link Rate and Contention Window for IEEE 802.11 Multi-Rate Wireless Networks," IEEE Transactions on Communications, vol. 60, No. 9, Sep. 2012, IEEE, pp. 2623-2634.

MCC Support, "Draft Report of 3GPP TSG RAN WG1 #96b v.0.1.0," R1-190xxxx, 3GPP TSG RAN WG1 Meeting #97, May 13-17, 2019, Reno, USA, 158 pages.

Vivo, "R1-1901441: Feature lead summary for Configured grant enhancement," 3GPP TSG RAN WG1, Ad-Hoc Meeting 1901, Jan. 21-25, 2019, Taipei, 12 pages.

International Search Report and Written Opinion for International Patent Application No. PCT/EP2020/061052, mailed Feb. 11, 2021, 24 pages.

Advisory Action for U.S. Appl. No. 16/393,516, mailed Nov. 12, 2021, 3 pages.

Non-Final Office Action for U.S. Appl. No. 16/393,516, mailed Jul. 27, 2020, 10 pages.

Non-Final Office Action for U.S. Appl. No. 16/393,516, mailed Nov. 5, 2020, 6 pages.

Final Office Action for U.S. Appl. No. 16/393,516, mailed Feb. 23, 2021, 8 pages.

Non-Final Office Action for U.S. Appl. No. 16/393,516, mailed Apr. 30, 2021, 11 pages.

Final Office Action for U.S. Appl. No. 16/393,516, mailed Sep. 2, 2021, 12 pages.

First Office Action for Chinese Patent Application No. 202080043492. 6, mailed Feb. 29, 2024, 14 pages.

* cited by examiner

REPLACEMENT DRAWING

REPLACEMENT DRAWING

REPLACEMENT DRAWING

HARQ-ACK REPORTING WITH PDSCH GROUPING

This application is a continuation of U.S. patent application Ser. No. 16/393,516, filed Apr. 24, 2019, now U.S. Pat. No. 11,349,614, the disclosure of which is hereby incorporated herein by reference in its entirety.

TECHNICAL FIELD

The disclosed subject matter relates generally to telecommunications. Certain embodiments relate more particularly to concepts such as wireless communication in unlicensed spectrum, 5G New Radio (NR), NR Unlicensed (NR-U), hybrid automatic repeat request acknowledgement (HARQ-ACK) reporting, and physical downlink shared channel (PDSCH) grouping.

BACKGROUND

NR provides flexibility in HARQ feedback timing to account for dynamic time-division duplexing (TDD) and to possibly combine several HARQ feedbacks for both lower overhead and higher reliability.

Figure (FIG. 1 shows an example of HARQ feedbacks for dynamic TDD, with data transmissions illustrated by shaded boxes in the downlink (DL), and the HARQ feedbacks illustrated by shaded boxes in the uplink (UL). The slot timing or offset (hereafter, "K1") between DL data transmission and acknowledgement is determined based on a 3-bit field in downlink control information (DCI). Radio Resource Control (RRC) signalling configures the set of eight (8) values to be indexed by K1 (possible value range is {0, 1, . . . , 15}).

HARQ codebook size in time (DL association set) is determined based on the configured set of HARQ-ACK timings K1, physical downlink control channel (PDCCH) monitoring occasions, and semi-static configured TDD pattern. For each slot, a user equipment (UE) may report a HARQ feedback bitmap of fixed size according to its carrier aggregation (CA) and transport block/codeblock group (TB/CBG) configuration (in this example 7 bit); not received TB/CBG are set to NACK.

A dynamic HARQ codebook provides the possibility to dynamically determine the set of HARQ process for which the HARQ feedback should be reported. The DCI typically includes a downlink assignment indicator (DAI) that indicates the number of HARQ process that should reported, and a PDSCH to HARQ-ACK timing that specifies time resource in which a network node (e.g. gNB) is expecting the feedback.

The UE refers to the DAI value to calculate the dynamic codebook size. For every PDSCH transmission, the DAI value in the DCI is incremented. The DAI in the DL scheduling DCI is typically stepped by one as compared to the immediate preceding DL scheduling DCI, if not, it is an indication that PDSCH transmission(s) has been missed. The difference between the two received DAI values at the UE in current and earlier DCI indicates how many PDSCH transmissions were missed.

DAI indicates the number of HARQ process that should reported. The DAI value in NR rel-15 is only 2-bits (representing 4 possible values 0,1,2,3), so after reaching the highest DAI value (i.e. 3), the DAI wraps around and starts again from the smallest value. FIG. 2 shows an example of changing DAI values.

Transmissions on unlicensed bands are subject to a listen before talk (LBT) procedure, therefore there is uncertainty if the transmission will go through or not depending on the LBT outcome.

First, if HARQ feedback transmission in uplink control information (UCI) is subject to LBT, there is a risk that the UE fails to perform the transmission depending on the LBT outcome. Due to the one-to-one mapping between PDSCH and corresponding feedback in the time domain, if the UE fails to transmit the feedback on the predefined time location, the gNB will have to assume a negative acknowledgement (NACK) and retransmit all the corresponding PDSCHs. The latter can be considered as an inefficient utilization of the band, and it also causes unnecessary increase in the channel contention.

Second, even if the UE successfully transmits the HARQ feedback, there are chances that the gNB may not be able to detect it. From gNB perspective, failed LBT or missed UCI transmissions are indistinguishable. Due to the one-to-one mapping between PDSCH and corresponding feedback in the time domain, if the gNB fails to detect the feedback in the predefined time location, the gNB will have to assume NACK and retransmit all the corresponding PDSCHs.

In view of these limitations, 3GPP agreed to support mechanisms to allow retransmission of the HARQ feedback. The following was agreed in RAN1 #96bis.

Restrict further discussion on HARQ codebook to the following:

For dynamic HARQ codebook:
  PDSCH grouping by explicitly signalling a group index in DCI scheduling the PDSCH
  gNB can request HARQ-ACK feedback in the same PUCCH for all PDSCHs in the same group
  Option 1:
    One PUCCH can carry HARQ-ACK feedback for one or more PDSCH groups
    DCI can request HARQ-ACK feedback for one or more PDSCH groups
    FFS one of the two options below
      C-DAFT-DAI can be accumulated across multiple PDSCH groups for which feedback is requested in the same PUCCH
      C-DAFT-DAI is accumulated only within one PDSCH group
    FFS: New ACK-Feedback Group Indicator for each PDSCH Group
    The number of HARQ-ACK bits for one PDSCH group is constant between a first HARQ-ACK feedback transmission and a HARQ-ACK feedback re-transmission, i.e. the PDSCH group cannot be enlarged after the first feedback transmission
  Option 2:
    One PUCCH can carry HARQ-ACK feedback for a single PDSCH group
      FFS: Feedback for more than one PDSCH group
    DCI can request HARQ-ACK feedback for a single PDSCH group
      FFS: Requests for more than one PDSCH group
    C-DAFT-DAI is accumulated within one PDSCH group
    A reset indicator signals new HARQ-ACK feedback for a PDSCH group
    The number of HARQ-ACK bits for one PDSCH group may not be constant between a first HARQ-ACK feedback transmission and a HARQ-ACK feedback re-transmission Semi-static codebook. Options FFS.

If request/trigger for one-shot group HARQ ACK feedback for all configured HARQ processes is introduced (at least for non-CBG HARQ), select one or more of the following candidate schemes:

The request is carried in a UE-specific DCI carrying a PUSCH grant

The request is carried in a UE-specific DCI carrying a PDSCH assignment

The request is carried in a UE-specific DCI not scheduling PDSCH nor PUSCH

The request is carried in a UE-common DCI

The request can be used for UE configured with dynamic or semi-static HARQ codebook

SUMMARY

In certain embodiments of the disclosed subject matter, PDSCH grouping and single-shot trigger are configured and implemented for NR-U operation, or alternatively for operation in licensed spectrum and/or a combination of licensed and unlicensed spectrum.

In certain embodiments, a method of operating a wireless device comprises receiving downlink control information (DCI) from a network node, determining a physical downlink shared channel (PDSCH) group based on information in the received DCI, and transmitting a hybrid automatic repeat request acknowledgement (HARQ-ACK) report to the network node based on the determined PDSCH group.

In certain related embodiments, the method further comprises receiving radio resource control (RRC) configuration information for at least one PDSCH group, wherein determining the PDSCH group comprises identifying a PDSCH group index within the DCI based on the received RRC configuration information. In some such embodiments, the RRC configuration information comprises at least one of (a) an indication of whether PDSCH grouping functionality is enabled with respect to the wireless device, (b) a maximum number of PDSCH groups, (c) a maximum number of PDSCH per PDSCH group, and (d) an indication of whether a reset indicator that signals new HARQ-ACK feedback for a PDSCH group is enabled. In some other such embodiments, the DCI comprises at least one of (a) a PDSCH group index field, and (b) a reset or request indicator that signals new HARQ-ACK feedback. The reset or request indicator could comprises, e.g. a bit map of PDSCH groups configured on a cell, with a corresponding bit mapped to each of the PDSCH groups.

In certain related embodiments, determining the PDSCH group based on the information in the received DCI comprises identifying a HARQ process identifier in the DCI; and determining the PDSCH group based on the HARQ process identifier.

In certain related embodiments, determining the PDSCH group based on the HARQ process identifier comprises associating a HARQ processes identifier with a PDSCH group based on at least one bit at least one or more predetermined positions in the HARQ process identifier.

In certain related embodiments, the method further comprises determining whether a HARQ feedback indicator is conveyed in a downlink data assignment DCI that includes a PDSCH-to-HARQ timing indicator and a physical uplink control channel (PUCCH) resource indicator for the HARQ-ACK report, and in response to the determination, jointly encoding HARQ feedback for the PDSCH group with HARQ for a PDSCH being scheduled by the downlink data assignment DCI.

In some embodiments of the disclosed subject matter, a wireless device comprises processing circuitry and transceiver circuitry collectively configured to perform a method as indicated above.

In some embodiments of the disclosed subject matter, a method of operating a wireless device comprises receiving, from a network node, a trigger for a hybrid automatic repeat request acknowledgement (HARQ-ACK) report, and in response to the trigger, transmitting, to the network node, the HARQ-ACK report, wherein the HARQ-ACK report comprises a new data indicator (NDI) value for a latest received physical downlink shared channel (PDSCH), along with HARQ feedback for the latest received PDSCH.

In certain related embodiments, the wireless device transmits the NDI and HARQ feedback for the latest PDSCH according to at least one of the following: (a) the wireless device receives a retransmission for an identified HARQ process and reports HARQ feedback for the identified HARQ process after soft combining with the latest received PDSCH, (b) the wireless device misses a retransmission for an identified HARQ process and reports HARQ feedback for the identified process based on a previous received PDSCH, (c) the wireless device receives a new PDSCH transmission for an identified HARQ process and reports HARQ-ACK feedback for the identified process based on the new PDSCH transmission, and (d) the wireless device misses a new transmission for an identified HARQ process and reports HARQ feedback for the identified process based on a previous received PDSCH.

In certain related embodiments, the trigger comprises information indicating a subset of configured HARQ processes to be reported in the HARQ-ACK report.

In certain related embodiments, the HARQ-ACK report comprises 2*H HARQ-ACK bits for HARQ processes, and wherein a corresponding HARQ codebook corresponds to an H*2 array with entries (h, b) each corresponding to a HARQ process h and an NDI value b.

A wireless device comprising processing circuitry and transceiver circuitry collectively configured to perform a method according to any of claims 10-13.

In some embodiments of the disclosed subject matter, a wireless device comprises processing circuitry and transceiver circuitry collectively configured to perform a method as indicated above.

BRIEF DESCRIPTION OF THE DRAWINGS

The drawings illustrate selected embodiments of the disclosed subject matter. In the drawings, like reference labels denote like features.

DESCRIPTION OF EMBODIMENTS

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

Certain concepts may be described herein with reference to particular technology fields or standards and/or using language applicable to those fields or standards. For instance, certain embodiments may be described with reference to cells, subframes/slots, channels, etc. as understood in the context of LTE, or with reference to beams, slots/mini-slots, channels, etc. as understood in the context of 3GPP NR. Nevertheless, unless otherwise indicated, the described concepts may be more generally applicable and are not to be limited according to any such field, standard, language, etc.

Figure 3:
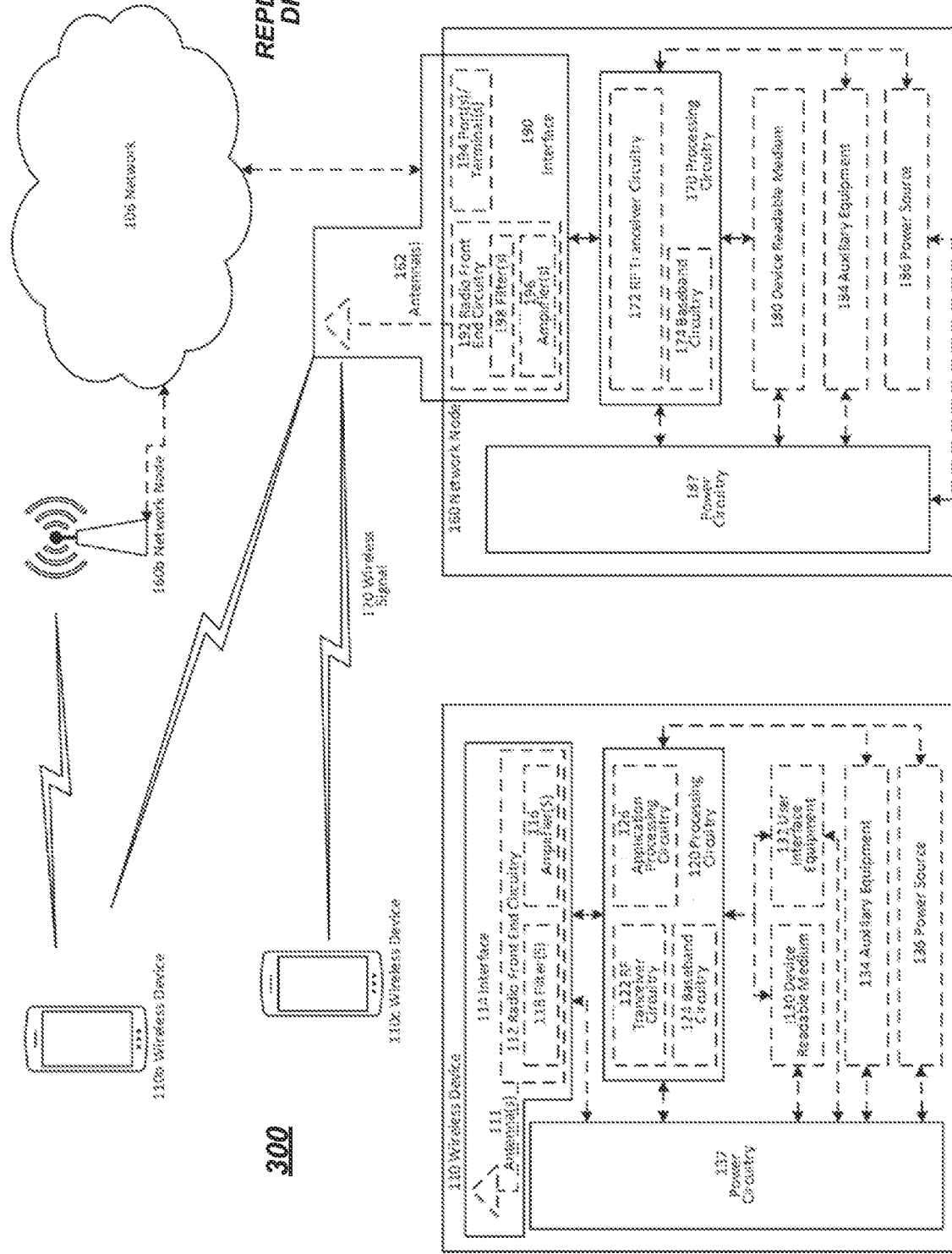
FIG. 3 illustrates a wireless network in accordance with some embodiments.

FIG. 3 illustrates wireless network in accordance with some embodiments. Although the subject matter described herein may be implemented in any appropriate type of system using any suitable components, the embodiments disclosed herein are described in relation to a wireless network, such as the example wireless network illustrated in FIG. 3. For simplicity, the wireless network of FIG. 3 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

Figure 1:
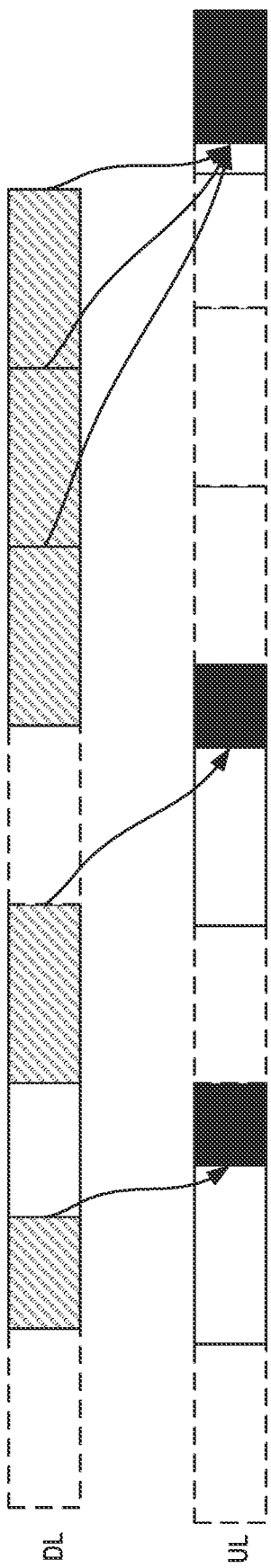
FIG. 1 illustrates HARQ feedbacks for dynamic TDD.

In FIG. 3, network node 160 includes processing circuitry 170, device readable medium 180, interface 190, auxiliary equipment 184, power source 186, power circuitry 187, and antenna 162. Although network node 160 illustrated in the example wireless network of FIG. 1 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 3 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 2:
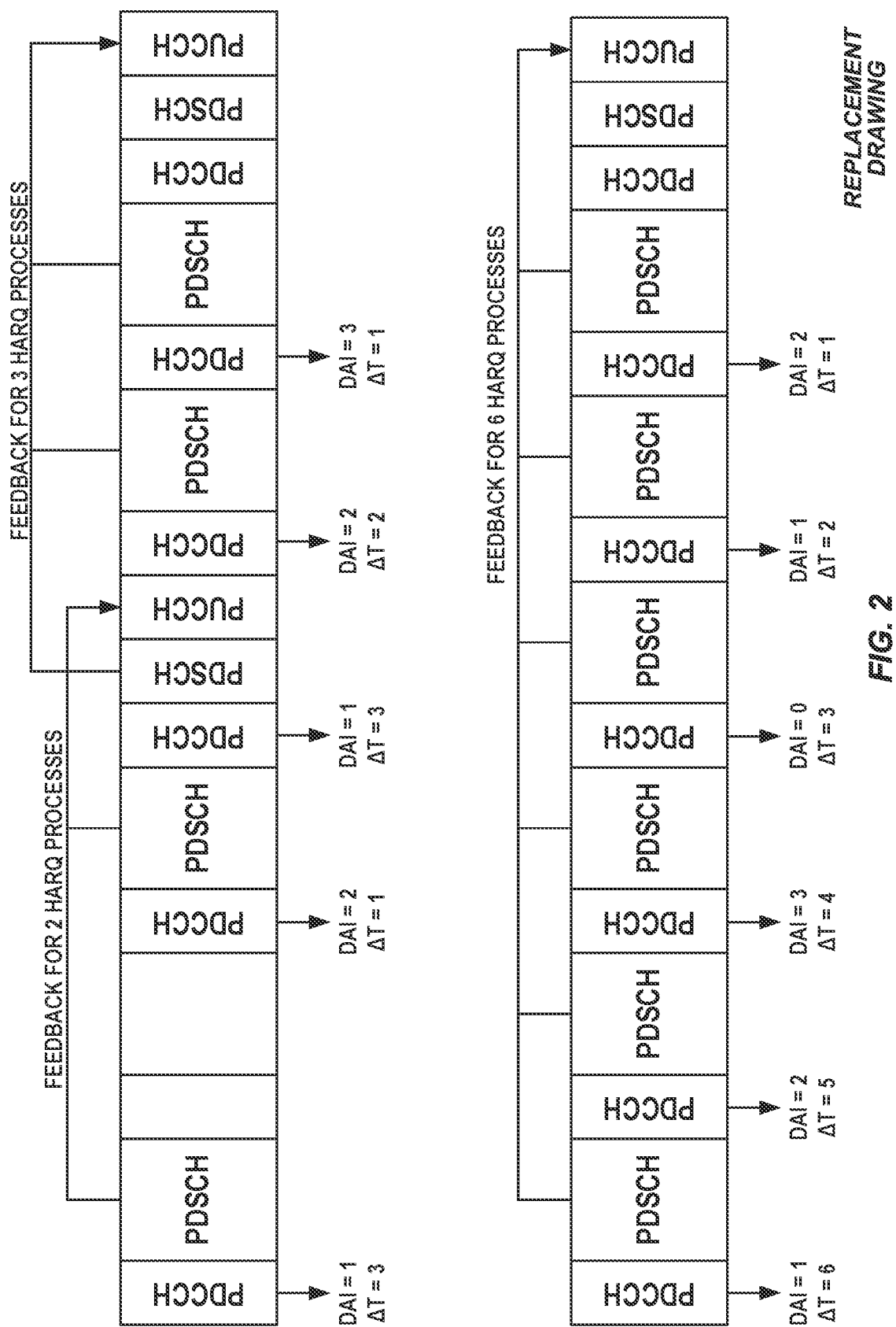
FIG. 2 illustrates changing DAI values.
Figure 4:
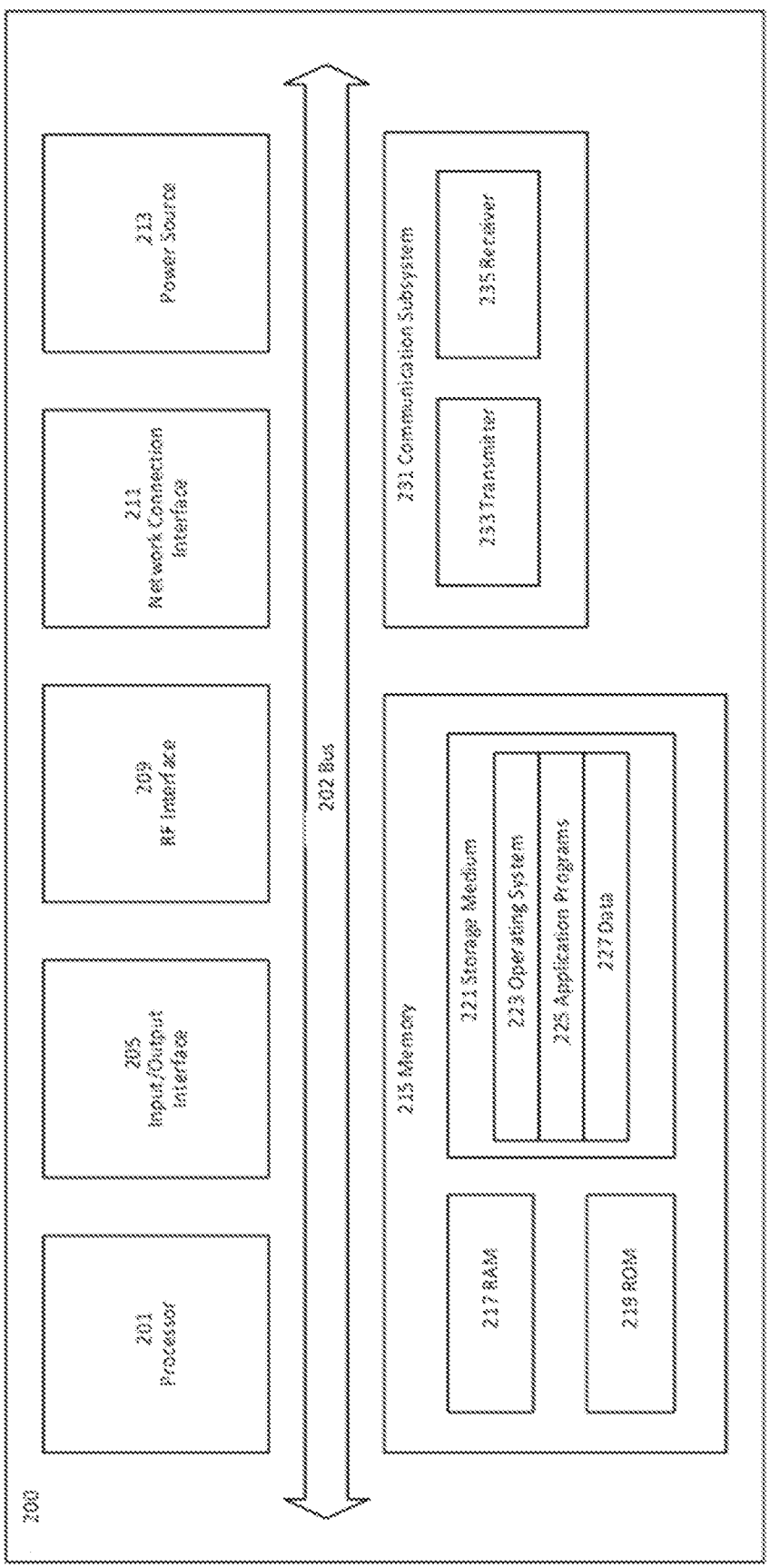
FIG. 4 illustrates a user Equipment in accordance with some embodiments.

FIG. 4 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 4, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeably. Accordingly, although FIG. 2 is a UE, the components discussed herein are equally applicable to a WD, and vice-versa.

In FIG. 4, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 4, or only a subset of the components. The level of integration between the components may vary from one UE to another UE. Further, certain UEs may contain multiple instances of a component, such as multiple processors, memories, transceivers, transmitters, receivers, etc.

In FIG. 4, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 4, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 4, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 5:
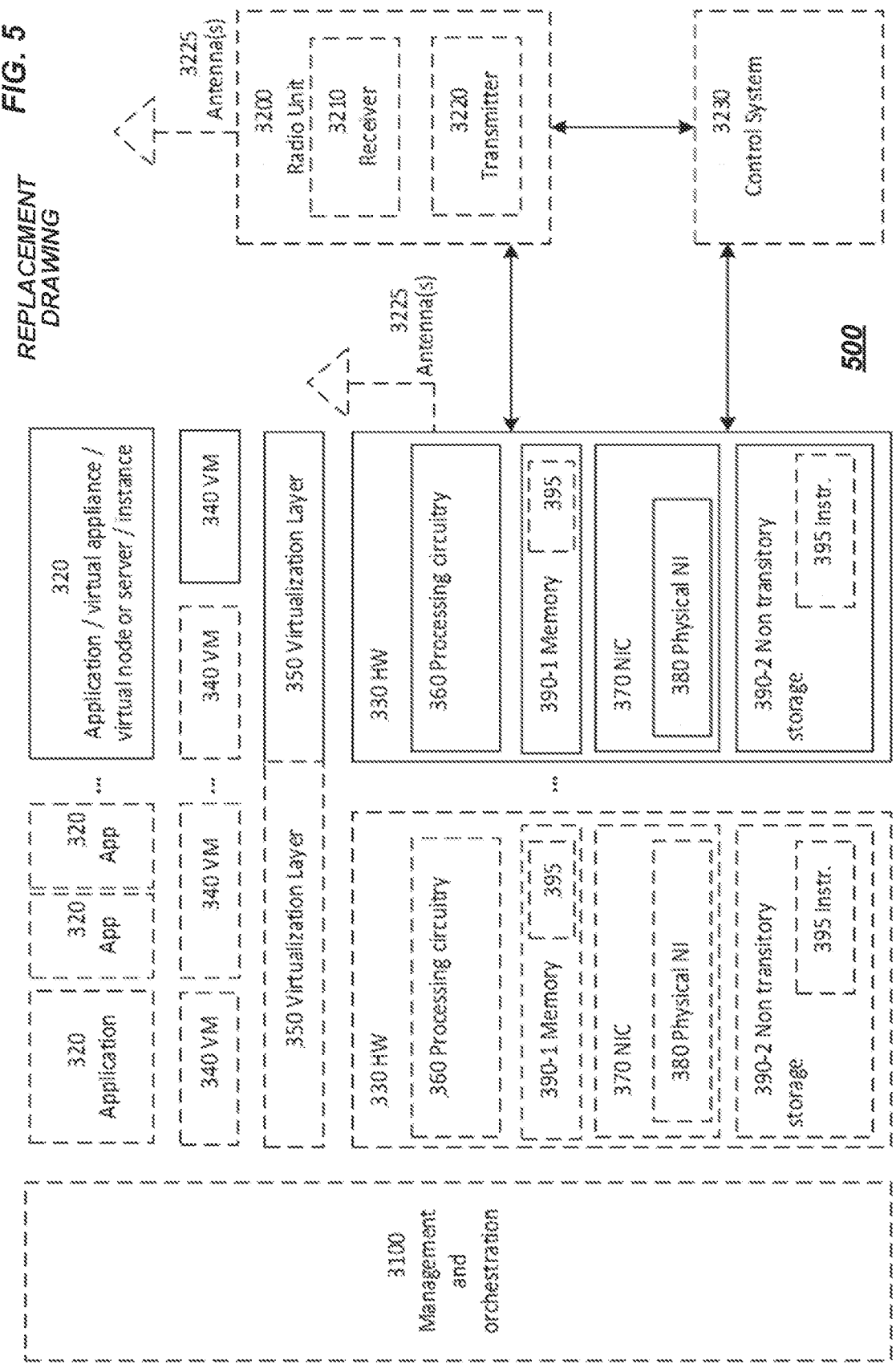
FIG. 5 illustrates a virtualization environment in accordance with some embodiments.

FIG. 5 is a schematic block diagram illustrating a virtualization environment 500 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 500 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 500 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 500, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 3, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 3.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 6:
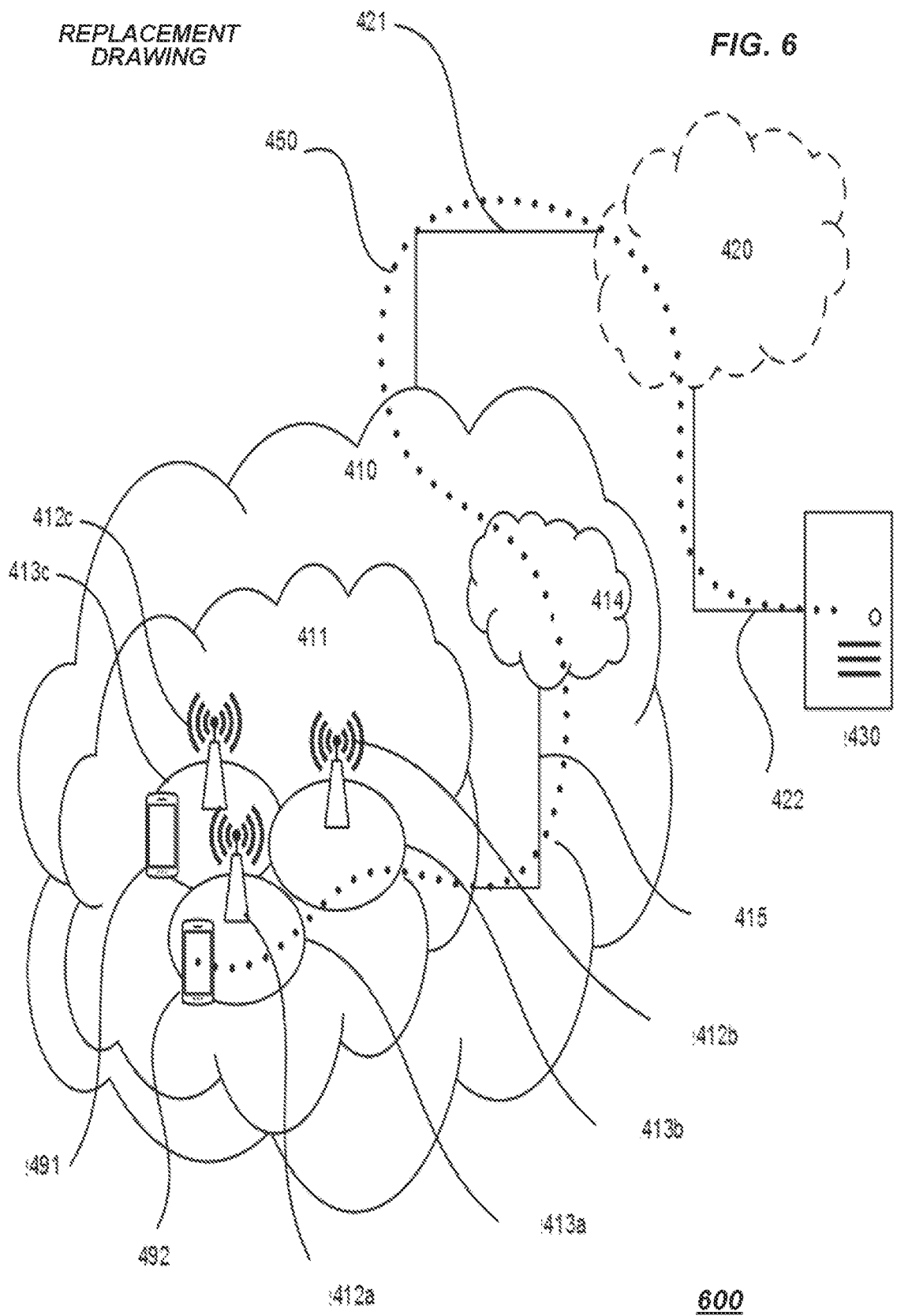
FIG. 6 illustrates a telecommunication network connected via an intermediate network to a host computer in accordance with some embodiments.

FIG. 6 illustrates a telecommunication network connected via an intermediate network to a host computer in accordance with some embodiments.

Referring to FIG. 6, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or it may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 4 as a whole enables connectivity between the connected UEs 491, 492 and host computer 430. The connectivity may be described as an over-the-top (OTT) connection 450. Host computer 430 and the connected UEs 491, 492 are configured to communicate data and/or signalling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 7:
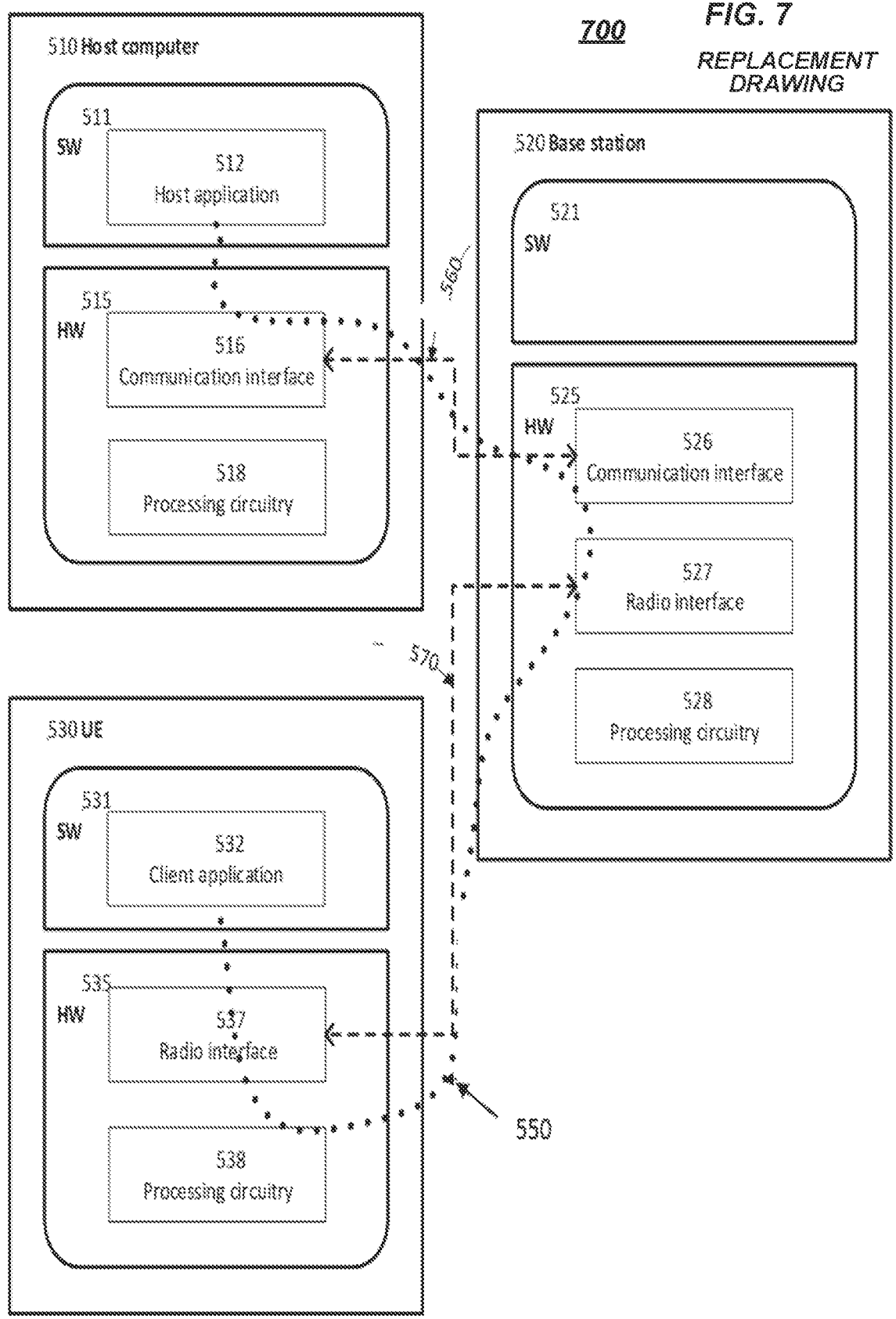
FIG. 7 illustrates a host computer communicating via a base station with a user equipment over a partially wireless connection in accordance with some embodiments.

FIG. 7 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 7. In communication system 700, host computer 510 comprises hardware 515 including communication interface 516 configured to set up and maintain a wired or wireless connection with an interface of a different communication device of communication system 700. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 700, as well as radio interface 527 for setting up and maintaining at least wireless connection 570 with UE 530 located in a coverage area (not shown in FIG. 7) served by base station 520. Communication interface 526 may be configured to facilitate connection 560 to host computer 510. Connection 560 may be direct or it may pass through a core network (not shown in FIG. 7) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 700 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 7 may be similar or identical to host computer 430, one of base stations 412a, 412b, 412c and one of UEs 491, 492 of FIG. 6, respectively. This is to say, the inner workings of these entities may be as shown in FIG. 7 and independently, the surrounding network topology may be that of FIG. 6.

In FIG. 7, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signalling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 8:
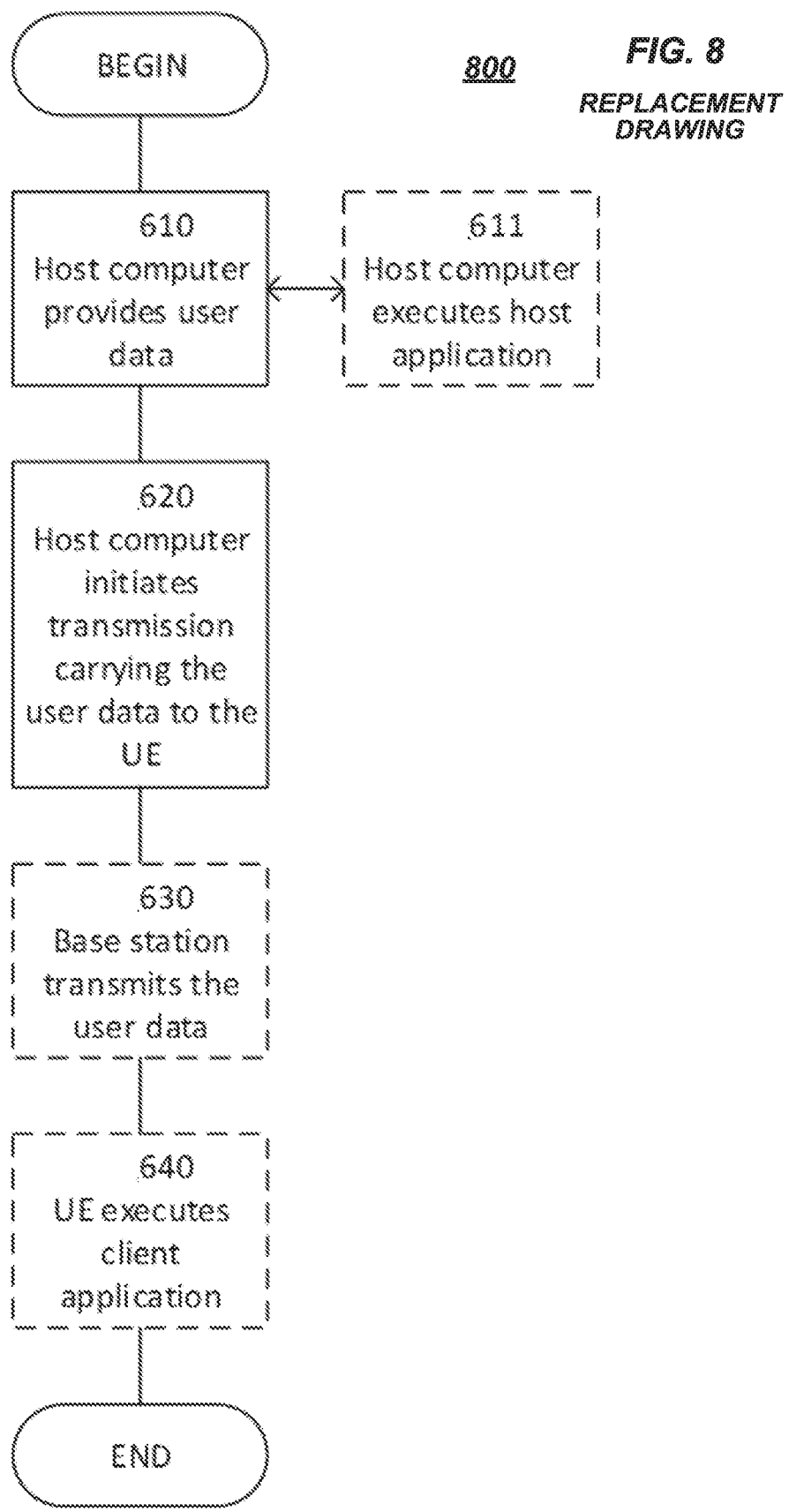
FIG. 8 illustrates methods implemented in a communication system including a host computer, a base station and a user equipment in accordance with some embodiments.

FIG. 8 is a flowchart illustrating a method implemented in a communication system, in accordance with one embodiment. The communication system includes a host computer, a base station and a UE which may be those described with reference to FIGS. 6 and 7. For the sake of brevity, only drawing references to FIG. 8 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 9:
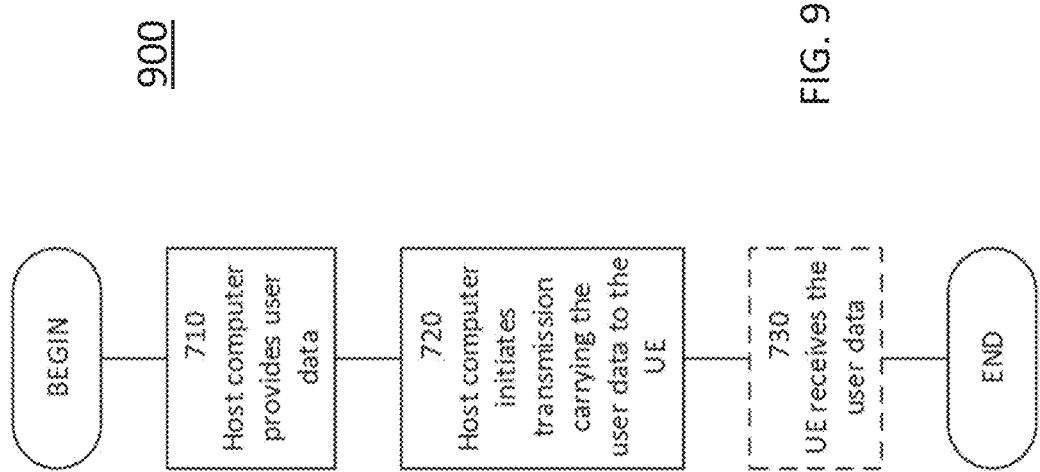
FIG. 9 illustrates methods implemented in a communication system including a host computer, a base station and a user equipment in accordance with some embodiments.

FIG. 9 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 9 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 10:
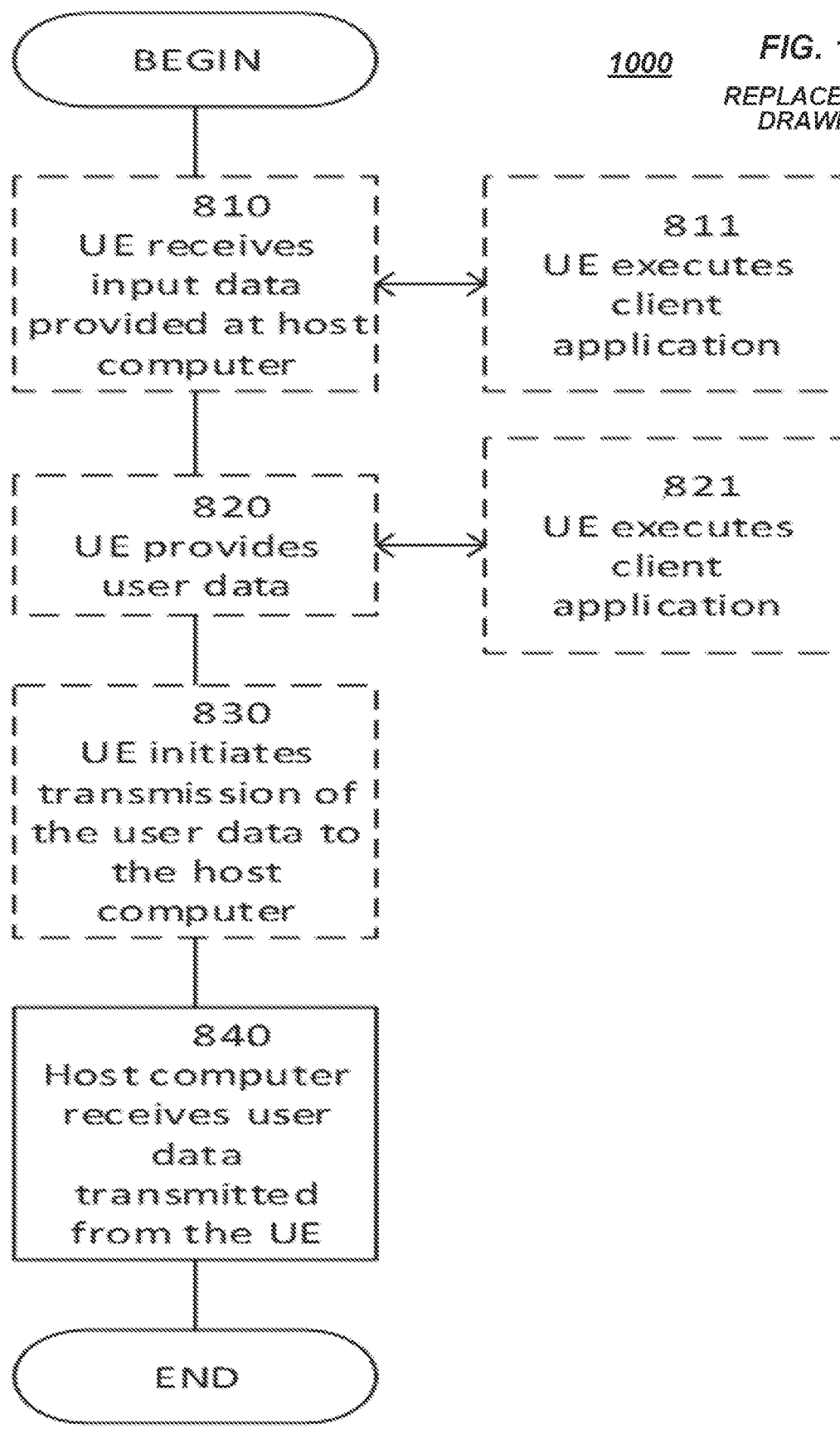
FIG. 10 illustrates methods implemented in a communication system including a host computer, a base station and a user equipment in accordance with some embodiments.

FIG. 10 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 10 will be included in this section. In step 810 (which may be optional), the UE receives input data provided by the host computer. Additionally, or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 11:
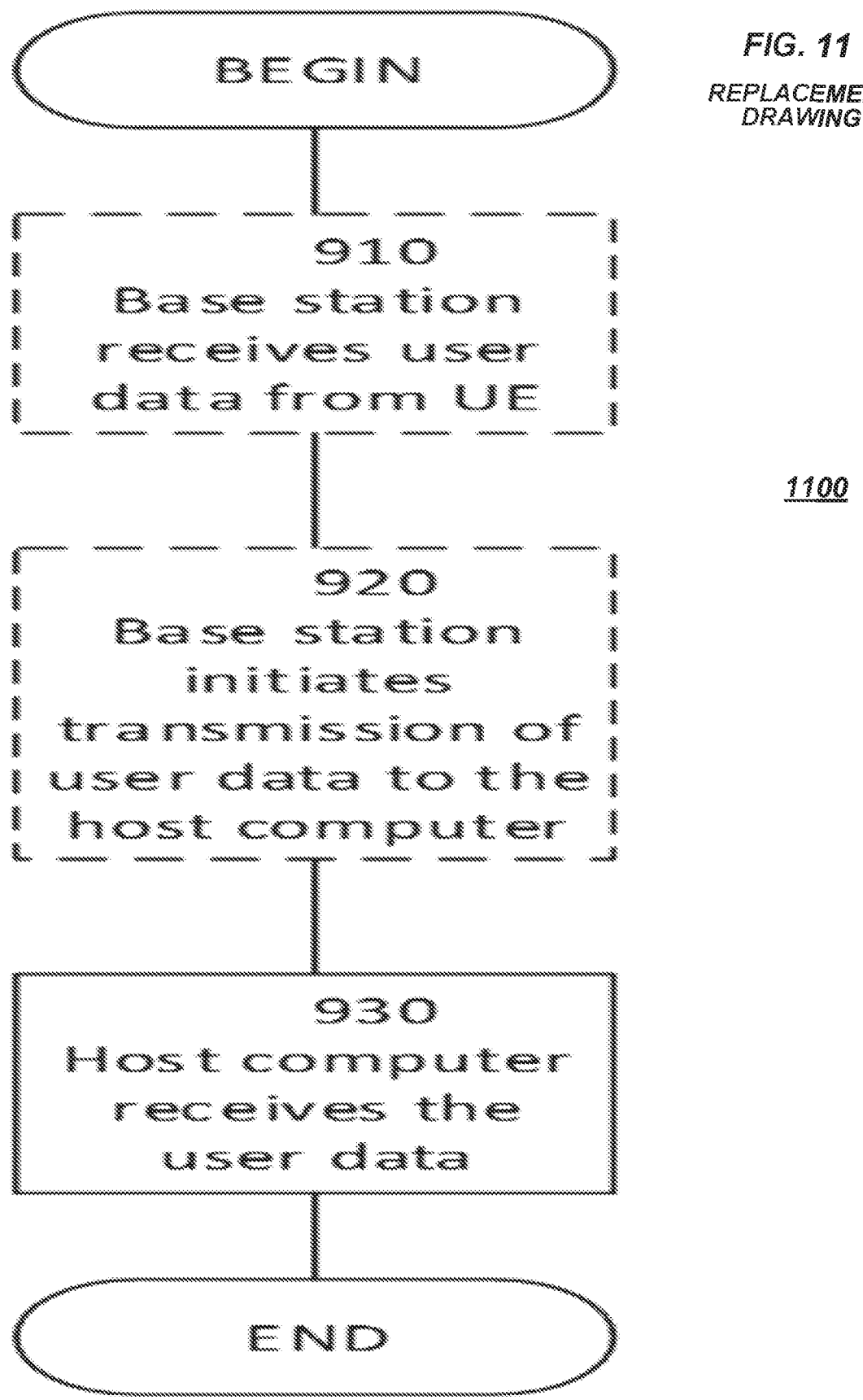
FIG. 11 illustrates methods implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 11 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Figure 12:
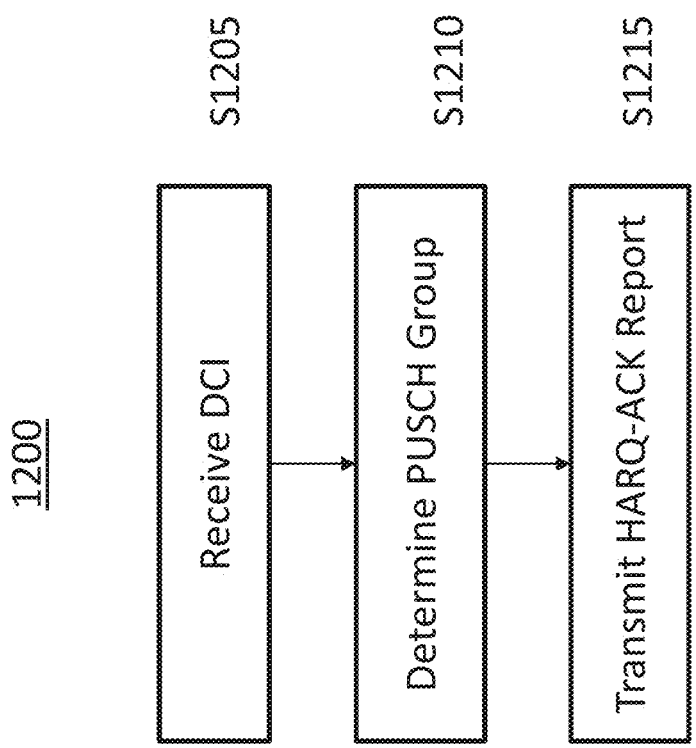
FIG. 12 illustrates a method in accordance with some embodiments.

FIG. 12 illustrates a method 1200 in a wireless device according to some embodiments.

Referring to FIG. 12, the method comprises receiving downlink control information (DCI) from a network node (S1205), determining a physical downlink shared channel (PDSCH) group based on information in the received DCI (S1210), and transmitting a hybrid automatic repeat request acknowledgement (HARQ-ACK) report to the network node based on the determined PDSCH group (S1215).

In certain related embodiments, corresponding operations may be performed in a network node (e.g. a gNB), such as assigning or determining PDSCH groups, transmitting the DCI, and receiving and processing HARQ-ACK report accordingly.

Figure 13:
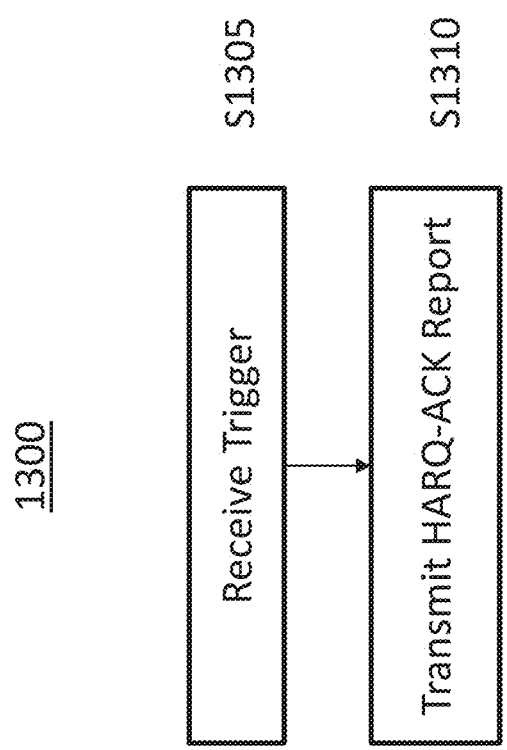
FIG. 13 illustrates a method in accordance with some embodiments.

FIG. 13 illustrates a method 1300 in a wireless device according to some other embodiments.

Referring to FIG. 13, the method comprises receiving, from a network node, a trigger for a hybrid automatic repeat request acknowledgement (HARQ-ACK) report (S1305), and in response to the trigger, transmitting, to the network node, the HARQ-ACK report, wherein the HARQ-ACK report comprises a new data indicator (NDI) value for a latest received physical downlink shared channel (PDSCH), along with HARQ feedback for the latest received PDSCH (S1310).

In certain related embodiments, corresponding operations may be performed in a network node (e.g. a gNB), such as assigning or determining PDSCH groups, transmitting the trigger, and receiving and processing HARQ-ACK report accordingly.

In the description that follows, certain embodiments are described in relation to PDSCH groups or PDSCH grouping functionality. In general, a PDSCH group is a set of PDSCHs that for which HARQ feedback is transmitted in some joint form, typically in the same PUCCH resource or slot. Similarly, PDSCH grouping is any process or act that results in multiple PDSCHs being assigned or identified in relation to different PDSCH groups. For instance, PDSCH grouping may be performed by signalling that assigns or identifies different PDSCHs to the same or different PDSCH groups. Such signalling may include, for instance, DCI that schedules or otherwise identifies a PUSCH and allocates and/or identifies a PUCCH resources to carry HARQ feedback for the PUSCH. The same DCI can also associate the PUSCH with a PDSCH group, or the PUSCH may become part of a PDSCH group through assignment to the same PUCCH resource as other PUSCHs. The HARQ feedback for a PDSCH group may be transmitted to a network node as a group or collection of bits, where different bits in the group or collection correspond to HARQ feedback for different PUSCHs. The group or collection of bits may be referred to as a HARQ codebook. The use of PDSCH grouping may provide certain potential benefits, such as allowing a wireless device or network node to perform certain actions in relation to an entire group, such as requesting feedback or performing some analysis for an entire group.

In general, the described embodiments may be performed, in whole or in part, in either licensed or unlicensed spectrum. For instance, any of the described control and/or data signalling may be performed in either uplink licensed or unlicensed spectrum, and uplink and/or downlink signalling may be performed in either uplink licensed or unlicensed spectrum. Certain embodiments, for instance, may be implemented in a standalone NR-U system in which communication is performed without accessing licensed spectrum.

In certain embodiments, explicit PDSCH grouping functionality is enabled or disabled via RRC. In such embodiments, the presence or absence of a PDSCH group index field in DCI may depend on an RRC configuration. The RRC configuration may indicate, e.g., one or more of the following:
  If the PDSCH grouping functionality is enabled or not
  Maximum number of PDSCH groups.
  The maximum number of PDSCH per group
  If reset indicator that signals new HARQ-ACK feedback for a PDSCH group is enabled or not If PDSCH grouping is enabled via RRC, the DCI may include one or more of the following:
  PDSCH group index field: x bits where x=ceil[log 2(Maximum number of PDSCH groups)].
  Reset or request indicator that signals new HARQ-ACK feedback. One of the following options is used
    A bit map of PDSCH groups configured on that cell with a corresponding bit mapped to each group. Number of bits=Maximum number of PDSCH groups.
    For instance,
      a bit corresponding to a certain HARQ process group set to specific value (0 or 1) indicates to the UE to retransmit/reset the HARQ feedback of the associated group. The bitmap may also encompass the PDSCH groups configured on multiple DL cells.
      a bit corresponding to a certain HARQ process group set toggled to indicate to the UE that the HARQ feedback of the associated group was correctly received. The bitmap may also encompass the PDSCH groups configured on multiple DL cells.
    A bit corresponding to the PDSCH group indicated in the DCI.

If the Maximum number of PDSCH groups is set to one, a PDSCH group index field may be omitted or not indicated in the DCI. The Reset/request indicator field typically comprises a single bit.

In certain embodiments, the number of HARQ feedback groups is configured via higher layer signalling, e.g. RRC layer configuration. In some of these embodiments, the size of each HARQ feedback group is fixed via higher layer signalling. One potential benefit of this grouping is the fixed group size. If the UE had previously missed one or more scheduling PDCCH, the HARQ-ACK feedback group size according to the present teaching will not be affected or miscalculated. Also in some of these embodiments, no additional group index is added to the DCI.

In some embodiments, the group is determined by a prefix of the HARQ process ID that is already present in the current DCI. As an example, if the UE is configured by the network to use two HARQ-ACK feedback groups, the HARQ processes with IDs that has 0 in the first bit belong to HARQ-ACK feedback group 0 and those with IDs that has 1 in the first bit belong to HARQ-ACK feedback group 1. More explicitly, if there are 16 HARQ processes, HARQ-ACK feedback group 0 contains HARQ processes #0, #1, . . . , #7, and HARQ-ACK feedback group 1 contains HARQ processes #8, #9, . . . , #15. As another example, if the UE is configured by the network to use four HARQ-ACK feedback groups, the HARQ processes are separated into four HARQ-ACK feedback groups based on the first two bits in the HARQ process IDs.

In some other embodiments, the group is determined by a postfix of the HARQ process ID that is already present in the current DCI. That is, the grouping of HARQ processes is based on the last few bits of the HARQ process IDs.

In still other embodiments, the higher layer signalling directly enumerates the HARQ process IDs for each HARQ-ACK feedback group. For example, the higher layer signalling can configure three HARQ-ACK feedback groups as: group 0 contains five HARQ processes with ID #0, #1, . . . , #4; group 1 contains five HARQ processes with #5, #6, . . . , #9; group 2 contains six HARQ processes with ID #10, #11, . . . , #15.

The higher layer signalling may also configure HARQ-ACK feedback groups with different numbers of HARQ processes in different groups, e.g. configuring group 0 to contain HARQ processes 0, 1 and 2 and group 1 to contain HARQ processes 3 and 4, or configuring group 0 to contain HARQ processes 0, 1 and 2 and group 1 to contain HARQ processes 3, 4, 5, 6 and 7. In cases where the number of HARQ processes is not evenly divisible by the number of HARQ-ACK feedback groups, a procedural rule could be specified to indicate a default number of HARQ processes in each HARQ-ACK feedback group. For instance, as first step, the sizes of all HARQ-ACK feedback groups are set to nrofHARQ-Processes //nrOfHARQ-ACK-feedbackGroups, where "//" indicates integer division (an equivalent denotation is "floor(nrofHARQ-Processes/nrOfHARQ-ACK-feedbackGroups)"). Then, in a second step, 1 is added sequentially to the size of HARQ-ACK feedback group 0, 1, 2 etc., until the sum of the sizes of the HARQ-ACK feedback group equals the number of HARQ processes.

In certain alternative embodiments, in response to a HARQ feedback request, the UE generates and reports the HARQ feedback for the specified PDSCH group(s).

If the HARQ feedback indicator is conveyed in a DL data assignment DCI which includes a PDSCH-to-HARQ-timing-indicator and a PUCCH resource indicator for the HARQ feedback transmission for the PDSCH being scheduled, the requested HARQ feedback for the specified PDSCH group(s) can be jointly encoded together with the HARQ feedback for the new PDSCH being scheduled and transmitted with specified timing and PUCCH resource.

If the HARQ feedback indicator is conveyed in a UL data grant DCI which schedules a PUSCH to be transmitted shortly afterwards, the requested HARQ feedback for the specified PDSCH group(s) can be multiplexed with the UL-SCH data and transmitted in the PUSCH transmission by means of UCI on PUSCH.

If the HARQ feedback indicator is conveyed in a DCI that doesn't schedule any PDSCH or PUSCH transmission, then the timing and resource for the request HARQ feedback transmission is expected to be included in the DCI, and the request HARQ feedback should be transmitted with that timing and resource.

The following description presents certain embodiments in which HARQ-ACK reports are generated in response to a one-shot trigger. In the description that follows, the term "all processes" or "every process" refers to certain HARQ processes that the network requests of the UE. For instance, where no specific HARQ-ACK feedback group is configured, "all processes" refers to all available HARQ processes. Alternatively, where at least one HARQ-ACK feedback group is requested by the network, "all processes" refers to all the HARQ processes belonging to said at least one HARQ-ACK feedback group.

In some embodiments, in response to a UE receiving a trigger for a HARQ-ACK report, for every HARQ process to be reported, the UE reports the corresponding latest NDI value for a latest received PDSCH for that HARQ process along with the corresponding HARQ-ACK for the received PDSCH.

In some embodiments, HARQ-ACK reporting may be performed as follows when a UE reports the latest NDI and HARQ-ACK for a HARQ process ID.

If the UE receives a retransmission of HARQ process h, it will report
HARQ-ACK for process h after soft combining with latest PDSCH
If the UE misses a retransmission of HARQ process h, it will report
HARQ-ACK for process h based on previous received PDSCH(s)
If a UE receives a new transmission of HARQ process h, it will report
HARQ-ACK for process h based on this PDSCH
If a UE misses a new transmission of HARQ process h, it will report
HARQ-ACK for process h based on previous received PDSCH(s)

If the NDI value matches the last transmitted value, the gNB assumes that the reported HARQ-ACK feedback correctly corresponds to process h. Otherwise, the gNB discards the reported HARQ-ACK feedback and assumes HARQ-ACK for process h is NACK.

In certain embodiments, the trigger indicates a subset of the HARQ processes to be reported. The report for any HARQ process in this set includes the corresponding latest NDI value for a latest received PDSCH for that HARQ process along with the corresponding HARQ-ACK for the received PDSCH.

In some embodiments, HARQ-ACK reporting may be performed as follows when a UE reports the latest NDI and HARQ-ACK for a HARQ process ID.

If the NDI value matches the last received value, the UE reports:
If the UE received a retransmission of HARQ process h, it will report
HARQ-ACK for process h after soft combining with PDSCH(s) scheduled using the same NDI value.
If the UE misses a retransmission of HARQ process h, it will report
HARQ-ACK for process h based on previous received PDSCH(s)
If a UE receives a new transmission of HARQ process h, it will report
HARQ-ACK for process h based on this PDSCH
If a UE misses a new transmission of HARQ process h, it will report
HARQ-ACK for process h based on previous received PDSCH(s)

If the NDI value does not match the latest received value, the UE discard the pending HARQ-ACK for process h (if there is any) and sends a NACK.

The UE reports 2*H HARQ-ACK bits for the H HARQ processes. The codebook is composed of H×2 array with entry (h, b) corresponding to HARQ process h and NDI value b, where h=0, 1, . . . , H−1 and b=0, 1.

For a HARQ process h with the NDI value of b in the last received scheduling PDCCH, the UE
reports the HARQ-ACK for process h in entry (h, b);
and sets the entry (h, 1−b) to NACK.

In certain alternative embodiments, after correctly receiving the feedback in response of one-shot trigger, a network node (e.g., gNB) updates the reset or request indicator for all reported PDSCH groups.

The DAI value for PDSCH groups with a received report for their corresponding HARQ process IDs, are reset to the corresponding initial value in addition to counting the PDSCH of that group that were not reported due to feedback timing that does not meet the required processing time.

In certain alternative embodiments, the timing and resources for a one-shot report have certain characteristics as described below. The UE may include the latest HARQ-ACK status for all received HARQ processes irrespective of the PDSCH-to-HARQ-timing-indicator indicated in the PDSCH scheduling grant as long as the processing time requirements are met.

The timing indication in the one-shot trigger (t1) overrides the one indicated in the PDSCH-to-HARQ-timing-indicator of the PDSCH scheduling DCI (t2), if the absolute timing corresponding to t2 is larger than the absolute timing corresponding to t1, under the condition that the processing time requirements are met.

The one-shot trigger can be included in a DL grant, for example in DCI format 1_0 or 1_1. In this case, the one shot-report is carried by a PUCCH resource in a slot. The slot for transmission of the PUCCH carrying the report, is determined by the PDSCH-to-HARQ-timing-indicator field in the DCI similarly to Rel-15. In one example, the size of the report i.e. the number of NDI and HARQ-ACK bits, determines the PUCCH resource set and the PUCCH resource indicator field in the DCI determines the PUCCH resource to be used for transmission in that set similar to Rel-15. In another example, a UE can be configured by higher layer with a PUCCH resource for one-shot reporting.

The one-shot trigger can be included in a UL grant, for example in DCI format 0_0 or 0_1. In one example, for PUSCH with UL-SCH, the multiplexing procedures for HARQ-ACK on PUSCH similar to those in Rel-15 are used to multiplex the report with UL-SCH on PUSCH. In case of PUSCH without UL-SCH (with or without CSI), the report is considered as HARQ-ACK UCI and multiplexed on PUSCH where in absence of CSI, only the report containing HARQ-ACK information is transmitted on PUSCH, following the mapping rules for HARQ-ACK transmission on PUSCH.

In certain alternative embodiments, the following concepts may apply to encoding a one-shot trigger for all or subset of the HARQ processes in the fallback DCI format.

In one alternative, DCI format 1_0 is used to schedule PDSCH and for sending user plane data is scrambled by C-RNTI or CS-RNTI or MCS-C-RNTI. In this embodiment, a one-shot trigger for all or subset of the HARQ processes is included in DCI format 1_0 without increasing the size of DCI format 1_0. To achieve this, the UL/SUL indicator is used to indicate the one-shot trigger since the use of the UL/SUL indicator is not envisioned to be needed in many scenarios where the one-shot trigger would be useful. The UE is configured with this bit as a one-shot trigger by higher layers in ServingCellConfig when the configuration for the cell is received by the UE.

In another alternative, one of the reserved bits in DCI format 1_0 is used to indicate the one-shot trigger.

In yet another alternative, DCI format 1_0 is used to signal one-shot trigger by setting some of the fields to a special value (i.e. validation bits). The DCI format 1_0 is used to trigger one-shot trigger feedback without scheduling PDSCH.

In the above embodiments, certain communications may be performed in part or in whole in unlicensed spectrum, e.g., While the disclosed subject matter has been presented above with reference to various embodiments, it will be understood that various changes in form and details may be made to the described embodiments without departing from the overall scope of the disclosed subject matter.

What is claimed:

1. A method of operating a wireless device, comprising:
receiving radio resource control (RRC) configuration information;
receiving downlink control information (DCI) from a network node;
determining a physical downlink shared channel (PDSCH) group based on information in the received DCI, wherein determining the PDSCH group comprises identifying a PDSCH group index within the DCI based on the received RRC configuration information; and
transmitting a hybrid automatic repeat request acknowledgement (HARQ-ACK) report to the network node based on the determined PDSCH group.

2. The method of claim 1, wherein the RRC configuration information comprises at least one of (a) an indication of whether PDSCH grouping functionality is enabled with respect to the wireless device, (b) a maximum number of PDSCH groups, (c) a maximum number of PDSCH per PDSCH group, and (d) an indication of whether a reset indicator that signals new HARQ-ACK feedback for a PDSCH group is enabled.

3. The method of claim 1, wherein the DCI comprises at least one of (a) a PDSCH group index field, and (b) a reset or request indicator that signals new HARQ-ACK feedback.

4. The method of claim 3, wherein the reset or request indicator comprises a bit map of PDSCH groups configured on a cell, with a corresponding bit mapped to each of the PDSCH groups.

5. The method of claim 1, wherein determining the PDSCH group based on the information in the received DCI comprises identifying a HARQ process identifier in the DCI; and determining the PDSCH group based on the HARQ process identifier.

6. The method of claim 1, wherein determining the PDSCH group based on the HARQ process identifier comprises associating a HARQ processes identifier with a PDSCH group based on at least one bit at least one or more predetermined positions in the HARQ process identifier.

7. The method of claim 1, further comprising determining whether a HARQ feedback indicator is conveyed in a downlink data assignment DCI that includes a PDSCH-to-HARQ timing indicator and a physical uplink control channel (PUCCH) resource indicator for the HARQ-ACK report, and in response to the determination, jointly encoding HARQ feedback for the PDSCH group with HARQ for a PDSCH being scheduled by the downlink data assignment DCI.

8. A method of operating a wireless device, comprising:
receiving, from a network node, a trigger for a hybrid automatic repeat request acknowledgement (HARQ-ACK) report; and
in response to the trigger, transmitting, to the network node, the HARQ-ACK report, wherein the HARQ-ACK report comprises a new data indicator (NDI) value for a latest received physical downlink shared channel (PDSCH), along with HARQ feedback for the latest received PDSCH.

9. The method of claim 8, wherein the wireless device transmits the NDI and HARQ feedback for the latest PDSCH according to at least one of the following:
the wireless device receives a retransmission for an identified HARQ process and reports HARQ feedback for the identified HARQ process after soft combining with the latest received PDSCH;
the wireless device misses a retransmission for an identified HARQ process and reports HARQ feedback for the identified process based on a previous received PDSCH;
the wireless device receives a new PDSCH transmission for an identified HARQ process and reports HARQ-ACK feedback for the identified process based on the new PDSCH transmission; and
the wireless device misses a new transmission for an identified HARQ process and reports HARQ feedback for the identified process based on a previous received PDSCH.

10. The method of claim 8, wherein the trigger comprises information indicating a subset of configured HARQ processes to be reported in the HARQ-ACK report.

11. The method of claim 8, wherein the HARQ-ACK report comprises 2*H HARQ-ACK bits for HARQ processes, and wherein a corresponding HARQ codebook corresponds to an H*2 array with entries (h, b) each corresponding to a HARQ process h and an NDI value b.

12. A wireless device comprising processing circuitry and transceiver circuitry collectively configured to:
receive radio resource control (RRC) configuration information;

receive downlink control information (DCI) from a network node;

determine a physical downlink shared channel (PDSCH) group based on information in the received DCI, wherein determining the PDSCH group comprises being configured to:

identify a PDSCH group index within the DCI based on the received RRC configuration information; and transmit a hybrid automatic repeat request acknowledgement (HARQ-ACK) report to the network node based on the determined PDSCH group.

13. The wireless device of claim 12, further configured to receive radio resource control (RRC) configuration information for at least one PDSCH group, wherein determining the PDSCH group comprises identifying a PDSCH group index within the DCI based on the received RRC configuration information.

14. The wireless device of claim 13, wherein the RRC configuration information comprises at least one of (a) an indication of whether a PDSCH grouping functionality is enabled with respect to the wireless device, (b) a maximum number of PDSCH groups, (c) a maximum number of PDSCHs per PDSCH group, and (d) an indication of whether a reset indicator that signals new HARQ-ACK feedback for a PDSCH group is enabled.

15. The wireless device of claim 13, wherein the DCI comprises at least one of (a) a PDSCH group index field, and (b) a reset or request indicator that signals new HARQ-ACK feedback.

16. The wireless device of claim 15, wherein the reset or request indicator comprises a bit map of PDSCH groups configured on a cell, with a corresponding bit mapped to each of the PDSCH groups.

17. The wireless device of claim 12, wherein determining the PDSCH group based on the information in the received DCI comprises identifying a HARQ process identifier in the DCI; and determining the PDSCH group based on the HARQ process identifier.

18. The wireless device of claim 12, wherein determining the PDSCH group based on a HARQ process identifier comprises associating the HARQ processes identifier with the PDSCH group based on at least one bit at least one or more predetermined positions in the HARQ process identifier.

19. The wireless device of claim 12, further configured to:

determine whether a HARQ feedback indicator is conveyed in a downlink data assignment DCI that includes a PDSCH-to-HARQ timing indicator and a physical uplink control channel (PUCCH) resource indicator for the HARQ-ACK report, and in response to the determination, jointly encoding HARQ feedback for the PDSCH group with a HARQ for a PDSCH being scheduled by the downlink data assignment DCI.

20. A wireless device comprising processing circuitry and transceiver circuitry collectively configured to:

receive, from a network node, a trigger for a hybrid automatic repeat request acknowledgement (HARQ-ACK) report; and in response to the trigger, transmit, to the network node, the HARQ-ACK report, wherein the HARQ-ACK report comprises a new data indicator (NDI) value for a latest received physical downlink shared channel (PDSCH), along with HARQ feedback for the latest received PDSCH.

21. The wireless device of claim 20, wherein the wireless device transmits the NDI value and the HARQ feedback for the latest PDSCH according to at least one of the following:

the wireless device receives a retransmission for an identified HARQ process and reports the HARQ feedback for the identified HARQ process after soft combining with the latest received PDSCH;

the wireless device misses a retransmission for an identified HARQ process and reports the HARQ feedback for the identified process based on a previous received PDSCH;

the wireless device receives a new PDSCH transmission for an identified HARQ process and reports HARQ-ACK feedback for the identified process based on the new PDSCH transmission; and the wireless device misses a new transmission for an identified HARQ process and reports the HARQ feedback for the identified process based on a previous received PDSCH.

22. The wireless device of claim 20, wherein the trigger comprises information indicating a subset of configured HARQ processes to be reported in the HARQ-ACK report.

23. The wireless device of claim 20, wherein the HARQ-ACK report comprises 2*H HARQ-ACK bits for HARQ processes, and wherein a corresponding HARQ codebook corresponds to an H*2 array with entries (h, b) each corresponding to a HARQ process h and an NDI value b.

* * * * *